Aug. 11, 1964 R. E. LUNNEY 3,144,636

ELECTRICAL CIRCUITS FOR COMMUNICATION NETWORKS

Original Filed July 24, 1957

INVENTOR
R. E. LUNNEY
BY
R. C. Winter
ATTORNEY 3,144,636
Patented Aug. 11, 1964

3,144,636

ELECTRICAL CIRCUITS FOR COMMUNICATION NETWORKS

Raymond E. Lunney, Madison, N.J., assignor to Bell Telephone Laboratories, Incorporated, New York, N.Y., a corporation of New York Original application July 24, 1957, Ser. No. 673,861, now Patent No. 2,972,683, dated Feb. 21, 1961. Divided and this application Nov. 30, 1960, Ser. No. 72,604
10 Claims. (Cl. 340—147)

Figure 1:
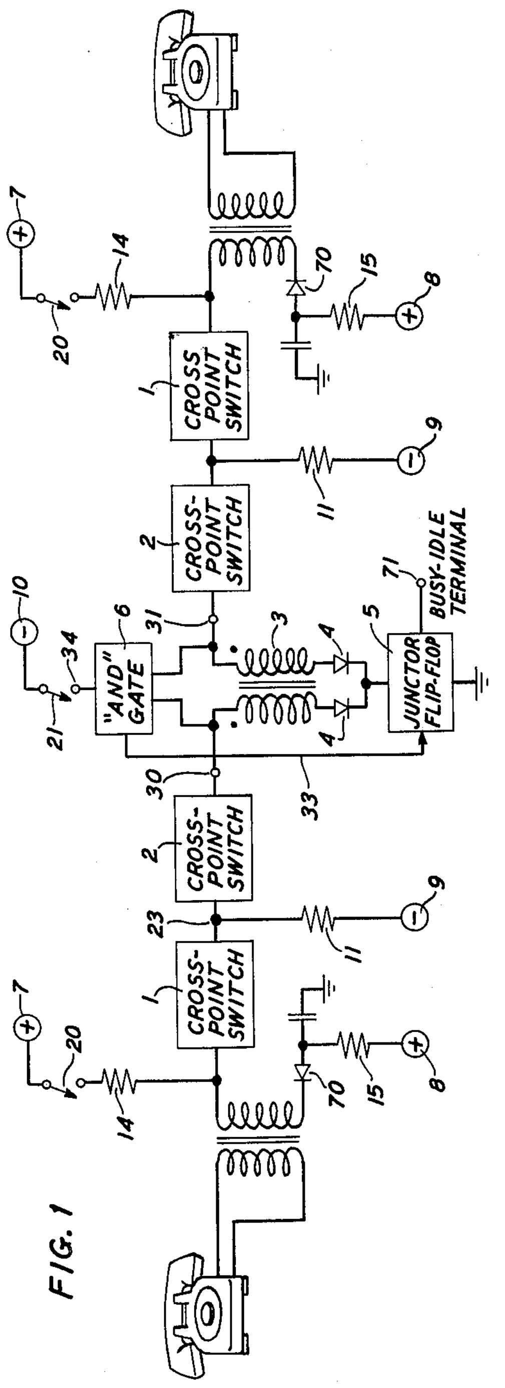

This invention relates to electrical circuits and, more specifically, to circuits for the establishment and control of a path through a communication network.

The present application Serial No. 673,861, filed July 24, 1957, issued February 21, 1961, as Patent No. 2,972,683.

In switching control networks for communication circuits, such as in telephone central office switching networks for example, the required function is the establishment and control of communication paths between pairs of a large number of spatially separated subscribers, and various systems have been devised to perform this function. One such system is disclosed in Patent 2,686,837 of S. T. Brewer and E. Bruce, issued August 17, 1954. This system follows the method of marking several alternate paths between the points to be connected and then selecting one of these paths by a second marking condition at an intermediate point.

The communication paths of a system of this kind are composed of a number of crosspoint devices interconnected in series-parallel combination in a fan-out configuration. Various devices suitable for use in such crosspoints are known in the art. The gas diode is one such device and a system utilizing gas diodes for crosspoints in a communication network is disclosed in Patent 2,684,405, issued July 20, 1954, to E. Bruce and H. M. Straube. Another switching system in which transistors are employed as the crosspoint devices is disclosed in Patent 2,876,285 of B. G. Bjornson and E. Bruce, issued March 3, 1959.

It is common for systems of the type referred to previously to separate the crosspoint switching network at some intermediate point by a control circuit which will be herein designated a junctor, although it has also been referred to as a bisector, or mactor circuit. Utilization of a junctor intermediate in a cross point switching network introduces a number of advantages. The margin requirements imposed on the associated crosspoint circuitry are thereby rendered less stringent and the fan-out network of interconnected crosspoints is less complex with a corresponding reduction in required equipment. Furthermore, junctors facilitate the control function in the switching of the communication paths through the crosspoint network. In Patent 2,883,470 of G. E. Jacoby and J. W. Rieke, issued April 21, 1959, a communication network employing gas tubes as crosspoints and junctors is disclosed in which the junctors function both to establish and to disestablish the paths through the network.

An object of my invention is the provision of an improved junctor circuit for a communication network.

A further object of my invention is the provision of a junctor circuit capable of functioning with simplified control circuitry.

Crosspoint switching networks of the type just described commonly have a pair of symmetrical circuit configurations on either side of a junctor circuit. Previously, it has been found necessary to apply a marking signal to the central junctor circuit as well as to the external marking terminals to cause the disestablishment of an existing connection. In one specific embodiment of my invention, I provide a coincident signal circuit to control a junctor flip-flop. The flip-flop of this specific embodiment makes use of a pair of transistors normally maintained in a nonconducting condition. Upon the simultaneous application of the proper signals the flip-flop is switched to its ON condition, which provides a low impedance to ground from both network terminals of the junctor thereby establishing and maintaining a communication path through the network until a marking signal is applied at either one of the communication network terminals to request the disestablishment of the communication path. By means of a feedback circuit in the junctor flip-flop, the flip-flop is thereby returned to its high impedance state which in turn disestablishes the path through the resistor in the emitter branch of the output transistor of the junctor flip-flop which, when the marking voltage drives a current above some critical value through this output resistor, causes both transistors to return to their nonconducting state.

My invention permits the flip-flop to be turned off by the same kind of external marking signal that is applied to initiate the connection. This permits considerable simplification of the control circuitry used in conjunction with the switching network and eliminates the need for some of the memory formerly provided in previous junctor circuitry.

It is a feature of this invention that a junctor circuit for use with a transistor communication network be so arranged that the junctor path may be switch to its high impedance state upon the application of one of the same signals which is used to establish a communication path initially.

It is also a feature of my invention that an alternating current transmission path be provided between a pair of terminals, in which path the conduction of alternating current is dependent upon the impedance to ground through an associated transistor which is in turn controlled by another transistor arranged with the first transistor in a bistable electrical circuit.

Figure 2:
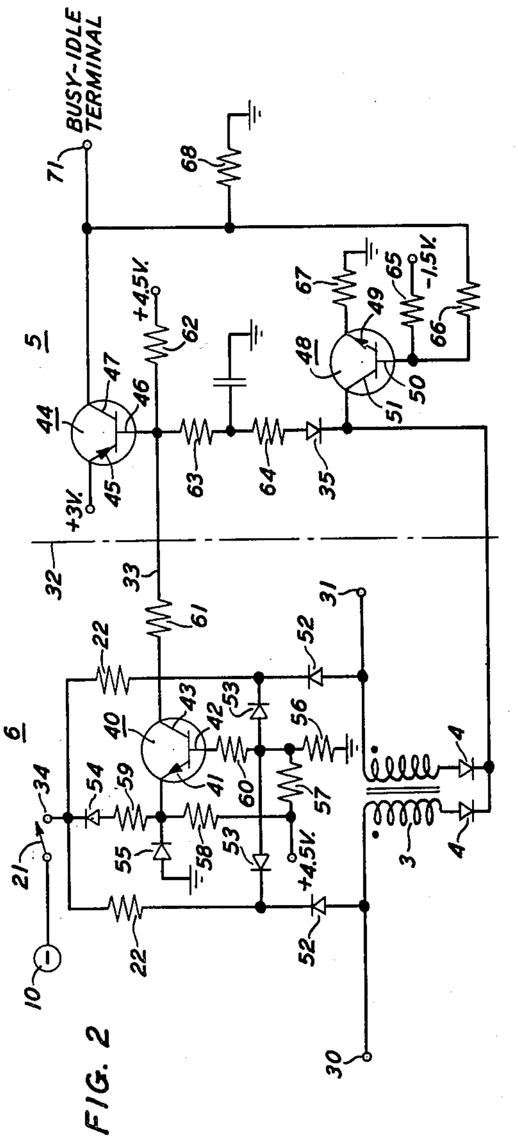

These and other features of this invention may be better understood by a more detailed description of the drawing, in which:

FIG. 1 is a schematic representation of a communication network including one specific embodiment of this invention; and FIG. 2 is a more detailed schematic representation of the portion of the circuit of FIG. 1 appearing between terminals 30 and 31.

FIG. 1 depicts a skeleton circuit representing a communication network connected between a pair of telephone stations. The circuit comprises a pair of symmetrical sections on either side of terminals 30 and 31. Each section includes outer crosspoint device 1 and inner crosspoint device 2 together with associated circuitry to provide for breaking down the crosspoints upon the application of proper control signals. Between terminals 30 and 31 is the junctor circuit which includes an AND gate 6, a junctor flip-flop 5, a transformer 3 and a pair of isolation diodes 4. The presence or absence of a communication path between the two telephone stations depends upon the state of conduction of the crosspoints 1 and 2 and the junctor flip-flop 5. Positive potential sources 8 provide holding voltages for the network which are sufficient in this circuit to maintain the crosspoints 1 and 2 in their low impedance state so long as the junctor flip-flop 5 is turned on and the crosspoints 1 and 2 have been broken down. Negative potential sources 9 serve to assist in the breakdown of crosspoint switches 1 upon the application of a sufficiently high positive voltage at the outside terminal of these crosspoint switches. This high voltage is supplied from positive potential source 7 which is of greater magnitude than potential source 8 and which furnishes a marking voltage through switch 20 and resistor 14 to initiate the establishment of a communication path through the network. Negative potential source 10 furnishes a negative marking potential through switch 21 to terminal 34 of the particular junctor which is to be used in establishing and maintaining the communication path.

Establishment of the communication path through the network proceeds as follows:

Marking potentials 7 are applied through switches 20 and resistors 14 to the external terminals at both ends of the crosspoint network. Working with negative sources 9 through resistors 11, the external marking signals break down crosspoint switches 1. Positive potentials are then established at point 23 between the crosspoint switches 1 and 2 which, acting with negative potential 10 applied to terminal 34 by the closure of switch 21, break down inner crosspoints 2 and drive terminals 30 and 31 positive to furnish two of the inputs to the AND gate 6. The negative marking signal at terminal 34 furnishes the other input to AND gate 6. With positive signals at terminals 30 and 31 and the negative potential at terminal 34, the AND gate provides a negative output on lead 33 to turn on junctor flip-flop 5 which then provides a low impedance path through itself to ground. With a low impedance path established from terminals 30 and 31 to ground, current can flow through the windings of transformer 3, thereby providing alternating current transmission through transformer 3 and permitting the communication path to be maintained by a lower holding voltage. Upon the simultaneous removal of all marking voltages by the opening of switches 20 and 21, the communication path is maintained and the crosspoint switches are held in their conducting state by holding voltages 8 applied through resistors 15 and diodes 70.

Disestablishment of an existing communication path through the network may be accomplished by the application of either one or both of the external marking potentials 7 at the end terminals of the network through switches 20 and resistors 14. In a manner which will be explained with reference to FIG. 2, application of either of these potentials 7 in the absence of the application of negative marking potential 10 causes the junctor flip-flop 5 to switch to its high impedance state, thereby opening the path through crosspoints 2. Then, upon the removal of marking potentials 7, crosspoint switches 1 return to their nonconducting state and the communication path is completely disestablished.

It should be here noted that the circuit depicted in FIG. 1 represents but a single one of the many alternate paths available in a crosspoint switching network. In any operational network, as in those of the patents hereinbefore cited, multiple connections to alternate crosspoints or junctors exist at each common point between crosspoints or between crosspoints and junctors. In the interest of clairity and simplicity these multiple connections are omitted from the diagram of FIG. 1.

FIG. 2 is a more detailed schematic representation of one specific embodiment of my invention which was shown in simplified form between terminals 30 and 31 in FIG. 1. In FIG. 2, terminals 30 and 31 correspond to the same terminals in FIG. 1. Transformer 3 and diodes 4 correspond to their counterparts in FIG. 1. The portion of FIG. 2 to the left of the vertical dash line 32, excluding transformer 3 and diodes 4, comprises the AND gate 6 of FIG. 1. The portion of FIG. 2 to the right of the dash line 32 corresponds to the junctor flip-flop 5 of FIG. 1. Transistor 40, having emitter 41, base 42 and collector 43, serves as the AND gate amplifier and is normally biased off by the +4½ volt potential source and resistors 56, 57, 58 and 60. The application of positive potentials to both of terminals 30 and 31 forward biases diodes 52 but finds diodes 53 and 54 in a reverse biased condition so no change in the state of conduction of transistor 40 occurs. However, if, while both terminals 30 and 31 are positive, the switch 21 is closed to provide a negative potential from source 10 to terminal 34, the emitter 41 of transistor 40 becomes clamped at ground potential by diode 55 and the current through resistor 59 and diode 54 to negative source 10. Since the base is maintained at some positive potential between ground and +4½ volts, as determined by resistors 56 and 57, transistor 40 now conducts and a negative output is delivered through resistor 61 along lead 33 to the base 46 of transistor 44 in the junctor flip-flop.

Transistor 44, having emitter 45, base 46 and collector 47, is normally biased off by a positive potential from the +4½ volt source delivered through resistor 62. Transistor 44 furthermore controls the state of conduction of transistor 48 which is also normally biased off by the application of a negative potential from the −1½ volt source through resistor 65 to the base 50. With the appearance of a negative signal from transistor 40 upon lead 33, transistor 44 is turned on and its collector 47 is switched near the potential of its emitter 45 which is +3 volts. This turns on transistor 48 through resistor 66, and transistor 48 then provides a low impedance path between its collector 51 and its emitter 49. Since resistor 67 has a comparatively low value of resistance, this means that a low impedance path is provided from terminals 30 and 31 through the now forward biased diodes 4, the transistor 48 and resistor 67 to ground. As explained before, this permits the crosspoints 1 and 2 to be maintained in their low impedance states and establishes the communication path through the entire network.

Resistor 67, being connected in the emitter circuit of transistor 48, provides a certain amount of degenerative feedback to that transistor. The resistance of resistor 67 is determined, in conjunction with the resistance in the rest of the crosspoint network and the selection of the holding potentials 8 and the positive marking potentials 7, so that transistor 48 is maintained in its low impedance condition so long as the crosspoint switches 1 and 2 are held on by the holding potentials 8 but will be switched to its high impedance state upon the closure of either of switches 20. The current from the 4½ volt bias source for transistor 44 flows through resistors 62, 63 and 64 and the diode 35 and thence through transistor 48 and the resistor 67. If the current through resistor 67 exceeds a certain critical value the base 46 of transistor 44 is driven sufficiently positive to turn off transistor 44, which then turns off transistor 48, and the junctor flip-flop is returned to its state of high impedance. As previously described, this opens the crosspoints 2 of FIG. 1 to initiate disestablishment of the communication path through the network.

As far as the flip-flop circuit is concerned, the collector 51 of transistor 48 is the output terminal of this circuit. This means that once the flip-flop is turned on, it is under the control of the current which is applied to its output terminal. So long as this current remains below some critical value, the flip-flop remains on. When this output current exceeds some particular value, the feedback provided by resistor 67 causes the flip-flop to be turned off. Thus, with control of the junctor possible from collector 51 of transistor 48 and from there through either or both of terminals 30 and 31, it can be seen how it is possible to achieve disestablishment of an existing communication path from the external terminals of the network alone without the need for additional memory circuits to keep track of which particular junctor is involved in any given communication path or for the provision of special signals to be supplied directly to the junctor circuit itself.

If desired the busy or idle state of the junctor circuit can be detected at a Busy-Idle terminal 71 connected to the collector 47 of transistor 44 and to resistor 68, the other side of which is grounded.

The values of voltage shown were those used to provide the proper operation of the depicted specific embodiment of my invention. It should be understood that my invention is not limited to the application of any particular voltage source or biasing arrangements.

While switches 20 and 21 are depicted in the drawing as being manually operated switches, it should be emphasized that electronic switches could readily be employed in place of those shown.

It is to be understood that the above-described circuits are merely illustrative of the application of the principles of the invention. Numerous other arrangements may be devised by those skilled in the art without departing from the spirit and scope of the invention.

What is claimed is:

1. In a communication switching network, a pair of terminals connected in a path to be established through the network, a transformer having a primary winding and a secondary winding each having one terminal connected to a different one of the terminals of said pair of terminals, a first amplifying device, an impedance, means connecting said first device and said impedance in series between ground and the other terminals of both of said windings, a second amplifying device, a coincidence circuit applying signals to bias said second amplifying device into conduction in response to the simultaneous occurrence of marking signals at said path terminals, means connecting an output of said second amplifying device to control the conduction condition of said first amplifying device to be conducting or nonconducting in response to similar conditions in said second device, and means including said impedance turning off said second amplifying device in response to the occurrence of only a single marking signal at either of said path terminals when said first amplifying device is conducting.

2. In the combination of claim 1, an impedance connected to said output of said second amplifying device and a busy-idle terminal connected across said impedance.

3. A junctor circuit for a communication switching network comprising a logic circuit and a bistable amplifier circuit, a pair of input terminals connecting said junctor circuit to adjacent sections of the switching network, a third input terminal connected to said logic circuit, means for causing said bistable circuit to assume its low impedance state upon the application of signals to all of said input terminals thereby maintaining a low impedance for alternating current between said pair of input terminals, and feedback means in said bistable circuit to cause said bistable circuit to return to its state of high impedance, said feedback means operative upon the application of a signal at either of said pair of input terminals to present a high impedance for alternating current between said pair of input terminals.

4. A junctor circuit as in claim 3 in which said logic circuit comprises an amplifying device having at least positive and negative electrodes and means controlling the impedance of said amplifying device to provide a low impedance between said positive and negative terminals only upon the simultaneous application of signals at all of said input terminals of said junctor circuit.

5. A junctor circuit as in claim 3 in which said bistable circuit comprises a pair of amplifying devices having at least positive and negative electrodes, means connecting the first of said amplifying devices to said pair of input terminals, means connecting said logic circuit to the other of said amplifying devices, and interconnecting means between said pair of amplifying devices.

6. A junctor circuit as in claim 5 in which said feedback means comprises a resistor connected to the electrode of said first amplifying device opposite the connecting means to said pair of input terminals and said interconnecting means.

7. In a communication switching network, a pair of terminals in a path to be established through the network, a normally high impedance device connected to said pair of terminals, means responsive to the application of marking signals at both of said terminals for causing said device to assume a low impedance and enable transmission of alternating current signals over said path including said pair of terminals, and means responsive to increased conduction through said device on occurrence of said marking signal at either of said terminals when said device is in its low impedance state for causing said device to resume its high impedance state and prevent transmission over said path.

8. In a communication switching network, the combination set forth in claim 7 wherein said device comprises a normally nonconducting transistor having base, emitter, and collector electrodes, one of said electrodes being connected to said pair of input terminals.

9. In a communication switching network, the combination set forth in claim 8 wherein said means responsive to the application of marking signals at both said terminals includes a second transistor having emitter, base, and collector electrodes and means connecting one of said second transistor electrodes to said first transistor base electrode.

10. In a communication switching network, the combination set forth in claim 9 wherein said means responsive to increased conduction through said first transistor further includes means connecting said one electrode of said first transistor to said second transistor base electrode.

References Cited in the file of this patent

UNITED STATES PATENTS 2,883,470 Jacoby et al. ----------- Apr. 21, 1959